Nov. 28, 1950      C. E. CAMPBELL      2,531,394
APPARATUS FOR MANUFACTURE OF PRECISION GLASS TUBING
Filed June 2, 1945
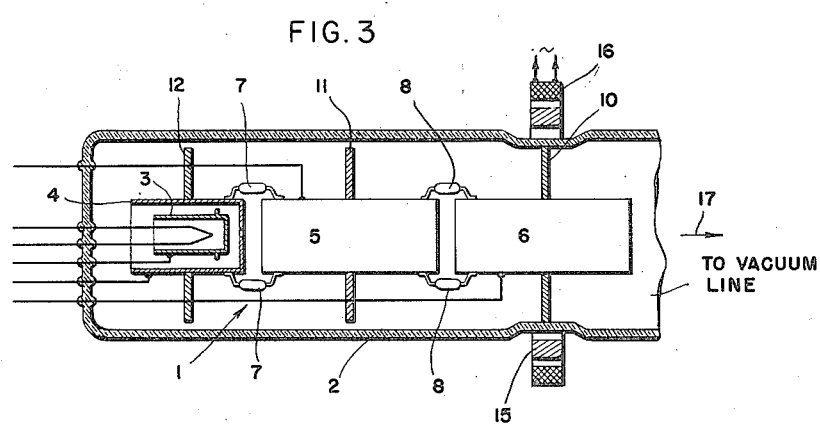
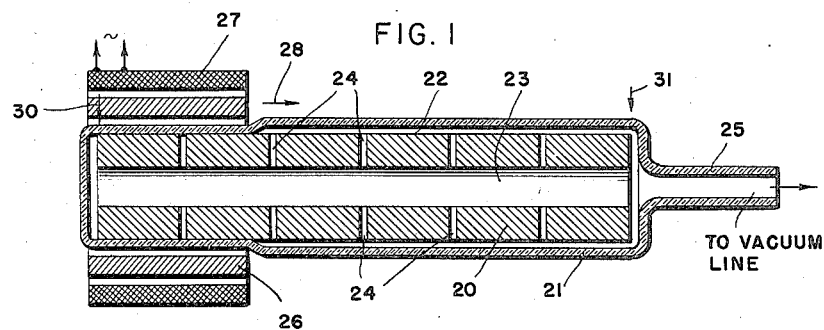
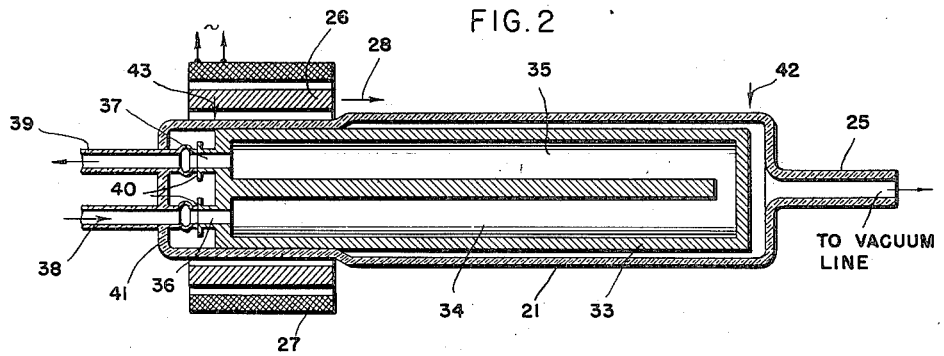
INVENTOR
CLAIR E. CAMPBELL
BY
ATTORNEY Patented Nov. 28, 1950

2,531,394

UNITED STATES PATENT OFFICE 2,531,394

APPARATUS FOR MANUFACTURE OF PRECISION GLASS TUBING

Clair E. Campbell, Fort Wayne, Ind., assignor, by mesne assignments, to Farnsworth Research Corporation, a corporation of Indiana Application June 2, 1945, Serial No. 597,241

3 Claims. (Cl. 49—7)

This invention relates to the manufacture of glass tubing, and more particularly relates to apparatus for forming a glass blank to a predetermined inner diameter.

One field of application of the present invention is the manufacture of glass tubing having a precision bore such, for example, as that used for manufacturing manometers, thermometers and the like devices. Glass tubing provided for such purposes should have a predetermined uniform inner diameter. It is well known that great difficulties arise in the manufacture of glass tubing having an inner diameter with a close tolerance. In some instances, such as for the manufacture of certain types of manometers, it is necessary to use two or more pieces of glass tubing with the same inner diameter. Hence, two or more matching glass tubes are usually selected from a large stock of tubes which is a very tedious procedure.

The glass forming technique of the present invention may also be used with advantage for securing an electrode assembly to its glass envelope. In cathode ray tubes and similar electrical equipment, such as certain types of television picture signal generating and picture reproducing tubes, it is conventional to employ composite electrode assemblies such, for example, as electron guns. The individual electrodes of an electron gun should be rigidly and accurately spaced and aligned in order to develop an electron beam of the required definition or spot size. One of the principal defects of electrode assemblies such as an electron gun is misalignment of the electrodes of the gun. It is conventional practice to arrange the electron gun of a cathode ray tube in a glass envelope and, hence, it is important to hold the electron gun in the proper alignment with respect to its glass envelope.

It is an object of the present invention, therefore, to provide a novel apparatus for shrinking a glass blank to a predetermined inner diameter.

A further object of the invention is to provide apparatus for manufacturing glass tubing having a precision bore.

Another object of the invention is to provide an apparatus for securing an electrode assembly such, for example, as an electron gun in proper alignment to its glass envelope.

In accordance with the present invention, the method of shrinking a glass blank to a predetermined, uniform inner diameter comprises heating the glass blank about a forming member and simultaneously subjecting the glass blank to a pressure on its interior which is less than the pressure on its exterior until the glass blank collapses against the forming member under the influence of the exterior pressure.

Further in accordance with the present invention, the method of securing an electrode assembly, such as an electron gun provided with a spacer and arranged in a glass blank, comprises exhausting the glass blank to a reduced pressure and heating the glass blank about the spacer until the glass blank is softened sufficiently to collapse under the influence of the atmospheric pressure into contact with the spacer.

In accordance with the present invention, there is also provided apparatus for manufacturing glass tubing from a glass blank comprising, for example, a metallic member having a smooth outer surface of a diameter corresponding to the inner diameter of the glass tubing to be manufactured. The metallic member is adapted to be arranged in the bore of the glass blank and has a longitudinal bore therethrough and radial ports for connecting the outer surface of the metallic member with the bore. In this manner trapping of air is prevented between the glass blank and the outer surface of the metal when the glass blank collapses against the outer surface of the metallic member.

For a better understanding of the invention, together with other and further objects thereof, reference is made to the following description, taken in connection with the accompanying drawing, and its scope will be pointed out in the appended claims.

In the accompanying drawing:

Fig. 1 is a sectional view of a forming mandrel provided in a glass tube blank and arranged for manufacturing precision glass tubing;

Fig. 2 is a sectional view of a modified forming mandrel provided in a glass tube blank in accordance with the invention; and Fig. 3 is a sectional view of an electron gun arranged in a glass envelope preparatory to securing the gun to its envelope in accordance with the invention.

Referring now more particularly to Fig. 1 of the drawing, there is provided forming mandrel 20 which may consist of a suitable metal such as steel and arranged in glass tube blank 21 for manufacturing a glass tube having a predetermined bore. Forming mandrel 20 is provided with a smooth outer surface 22 of cylindrical shape. The diameter of forming mandrel 20 corresponds to the inner diameter of the glass tubing to be manufactured. Forming mandrel 20 is provided with a longitudinal bore 23 extending therethrough and with radial ports 24 connecting outer surface 22 with bore 23. Ports 24 preferably have a small diameter for a purpose to be explained hereinafter. Bore 23 and ports 24 are provided to prevent trapping of air between glass tube blank 21 and surface 22 of mandrel 20. Glass tube blank 21 may be connected to glass tube 25 of reduced diameter and having a connection to a vacuum line for exhausting glass tube blank 21 so that its interior is subjected to reduced pressure. It is not necessary to provide a high vacuum in glass tube blank 21 as long as the pressure in blank 21 is sufficiently low with respect to the atmospheric or exterior pressure to provide for the required compression on the glass.

In accordance with the invention, means are provided for uniformly heating progressive sections of glass tube blank 21. For this purpose there may be provided ring 26 which may consist of metal or graphite and which is heated to an elevated temperature by induction coil 27. Induction coil 27 is arranged about graphite ring 26 and connected to a suitable high frequency alternating current source as indicated. Glass tube blank 21 is first exhausted through glass tube 25 to a reduced pressure. When a high frequency alternating current is now caused to flow through coil 27, graphite ring 26 is heated by induction and thus uniformly heats a section of glass blank 21. When the glass becomes sufficiently soft it collapses against forming mandrel 20 under the influence of the pressure difference between the atmospheric pressure and the reduced pressure in glass blank 21. Graphite ring 26 may thenced, intermittently or at a uniform rate of speed, in the direction indicated by arrow 28 until the entire length of glass blank 21 has been collapsed upon forming mandrel 20. The diameter of ports 24 should be so small that the softened glass forms a smooth inner surface.

In this manner a glass tube of any desired length may be formed. The finished glass tube may then be fractured at both ends, as indicated by arrows 30 and 31. It will be appreciated that forming mandrel 20 is heated when the hot glass comes into contact with its surface 22. The rate of expansion or contraction of forming mandrel 20 will usually be different from that of glass blank 21. Therefore, when both forming mandrel 21 and the finished glass tube have cooled to room temperature, the diameter of forming mandrel 20 will be slightly less than the inner diameter of the finished glass tube, and the mandrel may be removed from the glass tube. If desired the thus obtained glass tube may be sealed to another tube obtained in the same manner. The inner diameter of the glass tube corresponds exactly to the outer diameter of forming mandrel at the time the glass collapses against surface 22, that is when forming mandrel 20 is at an elevated temperature.

A modified form of the forming mandrel is illustrated in Fig. 2 in which like components are designated by the same reference numerals as were used in Fig. 1. Forming mandrel 33 is arranged in glass tube blank 21 which may be sealed to glass tube 25 connected to a vacuum line. Forming mandrel 33 is provided with communicating passageways 34, 35 for circulating a heating or cooling fluid therethrough such, for example, as water or steam. Passageways 34, 35 communicate with flanged metallic tubes 36, 37, respectively, which in turn are sealed to glass tubes 38, 39, respectively. Metallic tubes 36, 37 may be sealed to glass tubes 38, 39 in any suitable way. For this purpose a Housekeeper seal may be used or a Fernico joint which has been illustrated at 40 in Fig. 2. Glass tubes 38, 39 extend through glass closure member 41 which in turn is sealed to glass tube blank 21.

In accordance with the invention, glass tube blank 21 is first exhausted to a reduced pressure, and then hot water or steam is circulated through glass tube 38, metallic tube 36, passageways 34, 35, metallic tube 38 and glass tube 39. In this manner forming mandrel 33 may be brought to an elevated temperature which is below the softening point of glass blank 21. Thus, the outer diameter of forming mandrel 33 is kept at a value determined by the temperature of the mandrel. Glass blank 21 is now heated in the manner described hereinabove by graphite ring 21 heated in turn by induction coil 27. When the glass becomes sufficiently soft, it collapses against hot forming mandrel 33, and graphite ring 26 may be advanced intermittently or at a uniform rate of speed in the direction of arrow 28 until the entire glass blank 21 has been collapsed upon forming mandrel 33. The inner diameter of glass blank 21 is now equal to the predetermined outer diameter of hot forming mandrel 33. By circulating a fluid through passageways 34, 35 of forming mandrel 33, the temperature and hence the diameter of mandrel 33 may be kept at a constant value, although the hot glass which contacts mandrel 33 would normally tend to heat the mandrel.

Forming mandrel 33 may now be brought to room temperature which is, preferably, effected by circulating cold water therethrough. This causes forming mandrel 33 to shrink so that it may be removed from the glass tube. To this end the glass tube may be fractured at both ends, as indicated by arrows 42 and 43. The glass tube is now ready for use or may be sealed to another glass tube as desired. Closure member 41 may be sealed to another glass tube blank and the same operation repeated again. Thus, closure member 41 may be used repeatedly, and it is not necessary to effect another joint between metallic tubes 36, 37 and glass tubes 38, 39 every time another glass tube is manufactured.

It is also feasible to provide forming mandrel 33 with ports, such as shown at 24 in Fig. 1, to exhaust the air which may be trapped between forming mandrel 33 and the collapsing glass.

The outer diameter of forming mandrel 33 should be equal to the inner diameter of the glass tube to be manufactured when the mandrel is at its predetermined elevated temperature. The expansion of forming mandrel 33 at its elevated temperature should be sufficient so that enough clearance is provided between mandrel 33 and the finished glass tube when the mandrel has cooled to room temperature.

The combined action of the atmospheric pressure and the uniform softening of glass tube blank 21 will exert a very uniform force on the glass thus minimizing internal stress on the glass. However, it may be preferred to anneal the formed glass tubes to relieve them of any possible internal stress. The accuracy of the bore of the finished glass tubing is dependent only upon the accuracy with which the outer diameter of the forming mandrel may be machined. Hence, the inner diameter of the glass tubing can be kept within very close tolerances.

Referring now to Fig. 3, there is illustrated a particularly advantageous application of the invention for securing an electron gun to its glass envelope. As shown in Fig. 3, there is provided electron gun 1 arranged in glass envelope 2 preparatory to holding electron gun 1 in place with respect to glass envelope 2. Electron gun 1, shown by way of illustration, comprises indirectly heated cathode 3, control grid 4, first anode 5 and second anode 6, which may all be of conventional construction. Control grid 4 and first anode 5, which may both be arranged in the form of apertured cylinders, are secured together by insulating beads 7 which may, for example, consist of glass. First anode 5 and second anode 6, which may also be arranged as apertured cylinders, are rigidly spaced by glass beads 8 which may be similar to glass beads 7. In order to secure electron gun 1 to glass envelope 2, there are provided insulating spacer disks 10, 11 and 12 arranged, respectively, about second anode 6, first anode 5 and control grid 4.

In accordance with the present invention, glass envelope 2 is made to shrink about spacers 10, 11 and 12 to obtain a close fit therewith and thus to keep electron gun 1 in proper alignment with glass envelope 2. For this purpose means are provided for uniformly heating the glass about each spacer 10, 11 and 12. This may, for instance, be effected by induction heating, and thus there is provided ring 15 which may consist of a suitable metal or preferably of graphite. For the purpose of heating graphite ring 15 by induction, there is provided induction coil 16 arranged about graphite ring 15 and connected to a suitable source of high frequency alternating current as indicated. Glass envelope 2 is connected to a vacuum line as indicated by arrow 17 for subjecting its interior to reduced pressure for the purpose explained in connection with Fig. 1.

Glass envelope 2 is now uniformly heated about spacer 10 by connecting induction coil 16 to its alternating current source. Graphite ring 15 is thus brought to an elevated temperature, and glass envelope 2 in turn is heated, preferably, to its softening point. The atmospheric pressure will now cause glass envelope 2 to collapse about spacer 10 and to form a close fit therewith. The same process may now be repeated in order to shrink glass envelope 2 into contact with spacers 11 and 12 by placing graphite ring 15 and induction coil 16 about spacers 11 and 12, respectively. Thus, electron gun 1 is aligned and securely held in place with respect to glass envelope 2.

It will be understood that the number of spacers used as well as the particular construction of the electron gun are shown by way of example only. It is also to be understood that glass envelope 2 or glass tube blank 21 may also be heated by other means such as a suitable gas flame or electric resistance heating provided the glass is uniformly heated.

While there has been described what are at present considered the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Apparatus for manufacturing glass tubing from a glass blank comprising a metallic mandrel having a smooth outer surface of a diameter corresponding to the inner diameter of the glass tubing to be manufactured, passageways in said mandrel for circulating a fluid therethrough, said passageways communicating with two metallic tubes sealed to said mandrel, a glass closure member, glass tubes sealed to said metallic tubes and extending through said closure member, said closure member being adapted to be connected to said glass blank.

2. Apparatus for manufacturing glass tubing from a glass blank comprising, a metallic mandrel having a smooth outer surface of a diameter corresponding to the inner diameter of the glass tubing to be manufactured, passageways in said mandrel for circulating a fluid therethrough, a glass closure member adjacent one end of said mandrel, and tubes extending through said closure member and communicating with said passageways, said closure member being adapted to be connected to said glass blank.

3. Apparatus for manufacturing glass tubing from a glass blank comprising a hollow mandrel having a smooth outer surface of a diameter corresponding to the inner diameter of the glass tubing to be manufactured, and a glass closure member having openings communicating with said hollow mandrel for circulating fluid therethrough, said closure member being adapted to be connected to said glass blank.

CLAIR E. CAMPBELL.

REFERENCES CITED

The following references are of record in the file of this patent:

UNITED STATES PATENTS

| Number | Name | Date |
| --- | --- | --- |
| 1,301,714 | Kueppers | Apr. 22, 1919 |
| 1,963,008 | Weeks | June 12, 1934 |
| 2,084,811 | Keen | June 22, 1937 |
| 2,209,739 | Meyer | July 30, 1940 |
| 2,286,401 | Everett | June 16, 1942 |